Feb. 21, 1950     M. W. BRANDAU ET AL     2,498,104
COUPLING
Filed Sept. 18, 1948
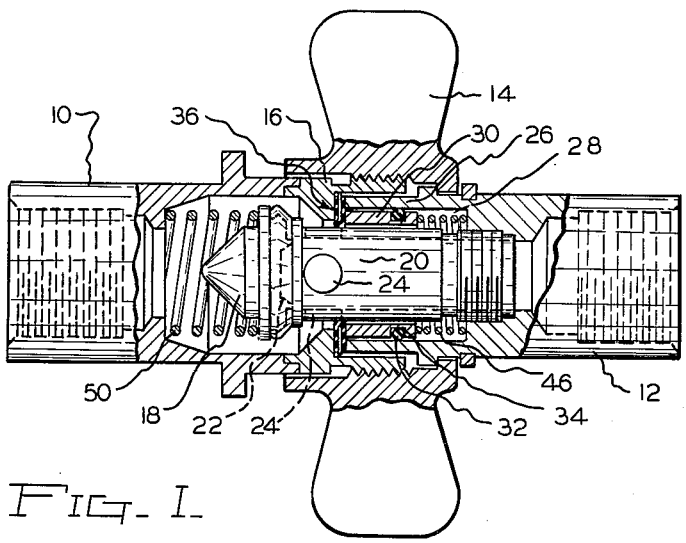
FIG. I.
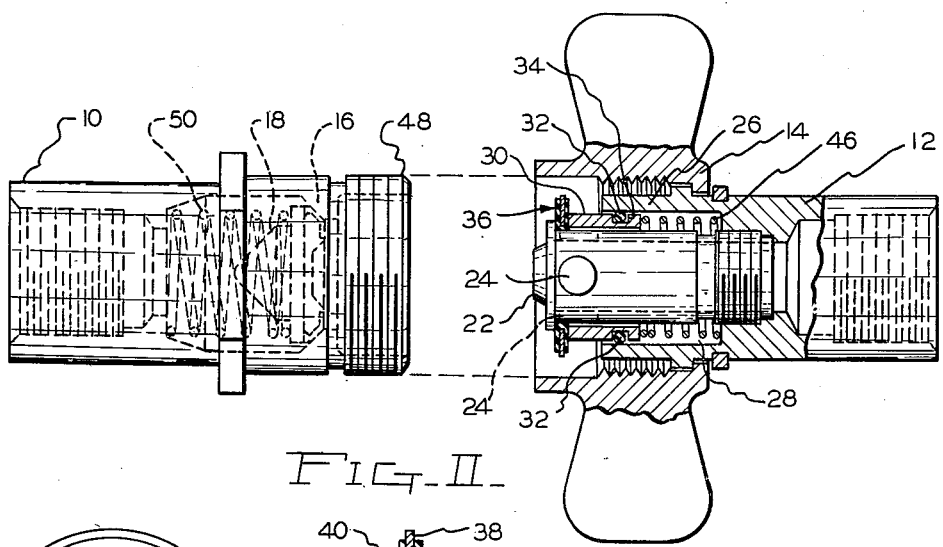
FIG. II.
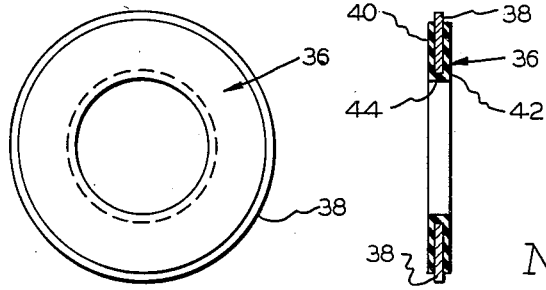
FIG. III.     FIG. IV.
Inventor
MARVIN W. BRANDAU
and BENJAMIN A. MAIN JR.
By Beaman & Patch.

Patented Feb. 21, 1950

2,498,104

UNITED STATES PATENT OFFICE 2,498,104

COUPLING

Marvin W. Brandau and Benjamin A. Main, Jr., Jackson, Mich., assignors to Aeroquip Corporation, Jackson, Mich., a corporation of Michigan Application September 18, 1948, Serial No. 49,886

1 Claim. (Cl. 284—19)

The present invention relates to self-sealing couplings of the type (as disclosed in United States Patent No. 2,208,286, granted July 16, 1940) which comprise a pair of hollow body parts adapted to be coupled together to form a common fluid conduit, the opposed ends of the body parts having abutting valve members, one of which is axially movable with respect to a surrounding annular seat fixed in its body part, while the other said valve member is provided at one end of a tubular section fixed within the other body part and forms, with an outer surrounding wall of the latter, an annular chamber in which a sleeve valve is mounted for reciprocable sliding motion upon said tubular section, said sleeve valve, when the coupling parts are separated, being resiliently biased to a position in which it overlaps and seals side ports, provided in the tubular section adjacent the fixed valve member, and seats against said fixed valve member.

In connection with these self-sealing couplings, and with the extension of the use of the couplings to the conveyance of gases, in, for instance, refrigeration or air conditioning systems, a good deal of attention and experimental research has had to be given to the arriving at a practical and commercially satisfactory construction of the valve sleeve provided for reciprocable motion upon the said fixed tubular section and within the said annular space and this having regard to the requirement that this valve sleeve should be capable of maintaining a fluid-tight seal at a number of different locations.

Several proposals have been made to solve the problem involved but these have necessitated either precision machining operations for arriving at metal-to-metal sealing surfaces or a relatively elaborate arrangement and construction of metal sleeve and rings of material, such as rubber, rubber composition or synthetic compositions or compounds, which enable a fluid-tight sealing contact to be maintained.

These prior proposals, in fact, have only been satisfactory at the expense of unduly high manufacturing and assembling costs, which it is the object of the present invention to avoid, as will become apparent from a consideration of the following description of one practical embodiment of the invention with reference to the accompanying drawings in which:

Fig. I is a longitudinal section of a self-sealing coupling with its two body parts in coupled condition and incorporating the improved and simplified sealing means, Fig. II is a similar view to Fig. I, but with the coupling body parts uncoupled, Fig. III is a side elevational view, on an enlarged scale, of the sealing ring employed in accordance with this invention, and Fig. IV is a central vertical section of Fig. III.

Referring to the drawings, the self-sealing coupling is shown as comprising two hollow body parts 10 and 12, capable of being coupled together, or uncoupled, by the actuation of a coupling nut 14, and including, in the one body part 10, a fixed annular valve seat 16 and an axially movable valve member 18, and, in the other body part 12, a centrally fixed tubular section 20 closed at one end by a valve seat 22 and having side port openings 24, this tubular section 20 forming, with the surrounding wall 26, an annular chamber 28, in which the reciprocable valve sleeve 30 is mounted.

This valve sleeve is of simple construction. It merely requires to be made as a simple sleeve adapted to fit over the tubular section 20 for sliding motion thereon but requires no precision finish since the required fluid-tight sealing actions are obtained with the use of a simple O ring 32, accommodated in a simple annular groove 34 on the exterior surface of the sleeve, and by a separately constructed and mounted ring structure, indicated generally at 36, and which, while of the simplest possible construction, nevertheless has several fluid-tight sealing positions and has been proven to be satisfactory and capable of being easily manufactured in an economical manner.

This ring 36 is constituted by a simple annular ring 38 (Figs. III and IV), of metal or other suitable hard material, and by an annular ring 40 of rubber, rubber composition or like material, which is capable of maintaining a fluid-tight seal when brought up against a seating surface and is itself of U-shape in cross section whereby to provide a pair of annular sealing ring surfaces 40 and 42 located upon opposite sides of the ring 38 and united across the inner periphery of the latter by the integral base surface of the U. The ring 36 can be stamped from sheet metal.

It will be seen, therefore, that this ring structure 36 is of the simplest possible construction and requires no precise machining operations or close tolerances, since the ring requires merely to be placed freely, or loosely, over the tubular section 20 for sliding motion thereon as the sleeve valve 30 (biased by the coil spring 46) is forced backwards or forwards in the uncoupling or coupling operations. The rubber or like ring is capable of being bonded to the inside ring 38, and would normally be so secured to the latter, but it is possible so to form the outer ring (40, 42, 44) to shape and associate it with the inside ring 38 that no bonding is necessary.

Also, while the sealing surfaces 40 and 42 might be separately formed and be applied (by bonding) to the opposite surfaces of the ring 38 the U formation is preferred, as it possesses the advantage that it prevents the possibility of the required sealing surfaces being displaced radially under the influence of high pressure fluid conveyed within the tubular section.

With the sealing arrangement thus provided, the O ring 32 serves to maintain a fluid-tight seal between the sleeve valve 30 and the interior surface of the surrounding wall structure 26, while the sealing surfaces 40 and 42 on the separately mounted ring 36 serve to maintain fluid-tight seals as follows:

When the coupling parts are connected as shown in Fig. I, the ring 36 is held tightly sandwiched, around its outer peripheral portion, between the annular valve seat 16 and the adjacent end edge of the wall structure 26. In this position therefore the sealing surfaces 40 and 42 combine to prevent any leakage of fluid past the thus contacted surfaces. In this condition the seat is positively maintained by the tightening of the coupling nut 14.

When, however, the coupling parts are disconnected, as shown in Fig. II, the ring 36 is urged to the left, by the action of the spring 46 against the valve sleeve 30, and is held firmly gripped about its inner peripheral portion between the outer peripheral portion of the valve seat 22 and the adjacent end edges of the valve sleeve 30, thereby providing an effective fluid-tight seal.

It will be seen from the drawings, that while, in the connected condition of the coupling parts, the valve sleeve 30 is confined within the annular chamber 28, the sealing ring 36 is of greater width and is so dimensioned, in relation to the valve head 22 and the annular valve seat 16, that it is able not only to seal against the former but also against the latter. This, however, has the important effect of enabling a fluid-tight seal to be maintained between the ring 36 and the seat 16 and valve sleeve 30 throughout the time that the connecting nut 14 is being actuated to disconnect or connect the coupling body parts.

As will be appreciated from consideration of Figs. I and II when the nut 14 is tightened upon the threaded portion 48 of the body part 10, the annular valve seat 16 bears against the ring 36 and causes the valve sleeve 30 to be urged to the right (as seen in the drawings) against the action of the spring 46 and thereby opens the fluid ports 24 to the flow of the high pressure fluid through the connected coupling parts, since in the meantime the valve member 18 will have been displaced from its seat 16, by its continued contact with the fixed valve member (or seat) 22, and this against the action of the coil spring 50. The general operation of the self-sealing coupling however is well known and does not need to be stressed herein.

Having thus described the invention in one practical form thereof and without wishing to be limited to the precise details described and shown in the drawings what we regard as the scope of our invention and wish to claim is:

In a coupling of the type which comprises a pair of hollow body parts adapted to be coupled together to form a common fluid conduit, the opposed ends of the body parts having abutting valve members, one of which is axially movable with respect to a surrounding annular seat fixed in its body part, while the other said valve member is provided at one end of a tubular section fixed within the other body part and forms, with an outer surrounding wall of the latter, an annular chamber in which a sleeve valve is mounted for reciprocable sliding motion upon said tubular section, said sleeve valve, when the coupling parts are separated, being resiliently biased to a position in which it overlaps and seals side ports, provided in the tubular section adjacent the fixed valve member, and seats against said fixed valve member, a separately formed sealing ring structure slidably mounted upon said tubular section between said fixed valve seat and the adjacent end of said valve sleeve, said sealing ring structure projecting radially from the tubular structure a sufficient distance to overlie and seal between the sleeve valve and its seat in the uncoupled position and between the ends of the surrounding body portions in the coupled position.

MARVIN W. BRANDAU.
BENJAMIN A. MAIN, Jr.

REFERENCES CITED

The following references are of record in the file of this patent:

UNITED STATES PATENTS

| Number | Name | Date |
| --- | --- | --- |
| 2,191,044 | Seligman | Feb. 20, 1940 |
| 2,311,239 | Main et al. | Feb. 16, 1943 |
| 2,416,967 | Thomas | Mar. 4, 1947 |